United States Patent Office 2,938,830
Patented May 31, 1960

2,938,830
NEW MOLLUSCICIDAL COMPOSITIONS

David Garnet Davey, Norman Greenhalgh, and Ronald Frederick Homer, Manchester, England, assignors to Imperial Chemical Industries Limited, London, England, a corporation of Great Britain No Drawing. Filed Apr. 7, 1958, Ser. No. 726,625

Claims priority, application Great Britain Apr. 17, 1957

22 Claims. (Cl. 167—30)

This invention relates to new molluscicidal compositions and more particularly it relates to new molluscicidal composition which contain certain triphenylmethane derivatives.

We have found that molluscs, for example snails, for example and in particular snails of the genera Australorbis and Bulinus which are Schistosome vectors, for example *Australorbis glabratus* and *Bulinus truncatus* are killed by contact with media which contain as little as about 0.25 part per million of certain triphenylmethane derivatives; that this lethal action is not impaired by the presence in or adjacent to the said media of such living and/or dead and/or decaying animal, vegetable and mineral matter as commonly forms part of the habitat of molluscs; and that said lethal action can most conveniently be brought about by the direct and/or indirect use of suitable compositions comprising the said triphenylmethane derivatives.

According to the invention we therefore provide new molluscidal compositions comprising as active ingredient or ingredients at least one triphenylmethane derivative of of the formula $R_3CR'$ wherein R stands for a phenyl radical, optionally substituted, and wherein R' stands for alkoxy, alkylamino or arylamino radicals, optionally substituted, and, when the active ingredient is basic, the acid-addition salts thereof.

As suitable salts of the above stated bases there may be mentioned for example the hydrochlorides, nitrates, sulphates and isethionates. The salts may also be derived from organic acids particularly from those acids having herbicidal properties such as 2-methyl-4-chloro- and 2:4-dichloro-phenoxyacetic acid and γ-2-methyl-4-chloro- and γ-2:4-dichloro-phenoxybutyric acid.

The compositions of the invention include for example compositions for direct application to molluscs. As suitable compositions for this purpose there may be mentioned for example solutions or dispersions comprising the said triphenylmethane derivatives together with liquid diluents or carriers. Such compositions may be applied for example as sprays or foams and may optionally contain adjuvants pertinent to such applications for example wetting agents and/or dispersing agents.

The compositions for indirect application also include compositions providing a means of distributing the active triphenylmethane derivatives in the aqueous habitat of molluscs, for example in ponds, lakes, canals, slow moving rivers, harbours and the like. Such compositions include, for example, solutions or dispersions comprising the active triphenylmethane derivatives together with water-miscible liquids for example acetone and optionally containing wetting and/or dispersing agents; also tablets, compressed blocks and dispersible powders, comprising the said derivatives and surface active agents for example dispersing agents and suspending agents and/or inert diluents therefor. The tablets or compressed blocks may also be suitably coated to delay release of the active agent into the aqueous medium. The addition of these compositions to aqueous media results in a more or less uniform distribution of the active triphenylmethane derivatives throughout said media. Further such compositions include for example solutions or dispersions comprising the active triphenylmethane derivatives together with water-immiscible liquids, preferably of a boiling range suitable for tropical use, including in particular oils for example kerosene and toluene and optionally containing a surface active agent. The addition of those compositions of this type which are lighter than water to aqueous media results in uniform and rapid distribution of the active derivatives over a large area of said media with eventual mixing with the bulk of the media so treated. The time and extent of the latter is a function of, inter alia, the specific gravity of the water-immiscible liquids or mixture of liquids employed and this factor is taken into account in devising the preferred compositions of this type. The compositions comprising the active triphenylmethane derivatives together with water-immiscible oils also include for example emulsions incorporating water and emulsifying agents as additional components and incorporation of the solutions or mixtures into soft gelatine capsules.

The compositions of the invention for application to the aqueous habitat of molluscs also include compositions comprising the active triphenylmethane derivatives together with absorbent materials. Suitable absorbent materials for this purpose include for example absorbent solid materials for example concrete, bricks and tiles and absorbent fibrous materials for example paper and cloth. These materials can be for example saturated and/or impregnated with the active triphenylmethane derivatives by standard procedures, for example by soaking said materials in solutions of the active triphenylmethane derivatives and if desired drying the materials. The addition of these compositions to aqueous media results in the gradual release of the active triphenylmethane derivatives into said media.

Suitable triphenylmethane derivatives for use in the compositions of the invention include for example the following: ethyl triphenylmethyl ether, n-butyl triphenylmethyl ether, methyl triphenylmethyl amine and its hydrochloride, ethyl triphenylmethyl amine and its hydrochloride, n-propyl triphenylmethyl amine and its hydrochloride, nitrate and isethionate, iso-propyl triphenylmethyl amine and its hydrochloride, n-butyl triphenylmethyl amine and its hydrochloride, iso-butyl triphenylmethyl amine and its hydrochloride, sulphate and nitrate, sec.-butyl triphenylmethyl amine and its hydrochloride, phenyl triphenylmethyl amine, p-chlorophenyl triphenylmethyl amine, n-propyl tri-(p-tolyl)methyl amine and n-propyl tri-(p-chlorophenyl)methyl amine. The preferred compounds to be used in the compositions of the present invention are n-propyl triphenylmethyl amine and its acid-addition salts and iso-butyl triphenylmethyl amine and its acid-addition salts.

The compositions of the invention may optionally contain additional ingredients which can usefully be applied together with the active molluscicidal ingredient or ingredients for example in order to reinforce and/or supplement the molluscicidal action thereof. Such additional ingredients include for example known molluscicides for example copper sulphate and known herbicides and insecticides such as 2-methyl-4-chloro and 2:4-dichloro-phenoxyacetic acid and salts thereof, γ-2-methyl-4-chloro- and γ-2:4-dichlorophenoxybutyric acid and salts thereof, dichlorodiphenyltrichloroethane and γ-benzene hexachloride.

Preferred compositions are those wherein the active ingredient is dissolved in an organic solvent such as toluene or kerosene in the presence of a wetting agent such as a condensation product of octylcresol with 8–10 molecular proportions of ethylene oxide whereby there is present between 0.5 and 50% by weight of active molluscicidal ingredient and preferably between 5 and 40% by weight of active molluscicidal ingredient. These compositions are intended for essentially stagnant water for example ponds, lakes or canals. Other particularly valuable compositions are dispersible powders containing the active ingredient in the form of a salt thereof for example the hydrochloride in the presence of a wetting agent such as a condensation product of octylcresol with 8–10 molecular proportions of ethylene oxide and a dispersing agent such as polyglyceride ricinoleate. These compositions are particularly useful in canals with some water movement for example where pumping stations are normally extant and in slow moving rivers.

The compositions described above can be used directly or indirectly as molluscicides and are preferably used so that there is present between 0.05 and 2.5 parts of active molluscicidal ingredient per million parts by weight of water in the areas to be treated.

We are aware that certain of the triphenylmethane derivatives described above which are bases and salts derived from alkylamines are known compounds for example methyl triphenylmethyl amine and its hydrochloride, ethyl triphenylmethyl amine and its hydrochloride, n-propyl triphenylmethyl amine and its hydrochloride and tert.-butyl triphenylmethyl amine. The remaining compounds of this type and the acid-addition salts thereof are new compounds.

Thus according to a further feature of the invention we provide those new compounds of the formula $R_3CNHR''$ wherein R stands for a phenyl radical, optionally substituted, and R'' stands for an alkyl radical, and the acid-addition salts thereof.

Particularly valuable salts are the hydrochlorides, sulphates, nitrates and isethionates and a preferred compound is iso-butyl triphenylmethyl amine and the acid-addition salts thereof.

According to a further feature of the invention we provide a process for the manufacture of the said new triphenylmethane derivatives which comprises interaction of the corresponding triphenylmethyl halide and an alkyl-amine optionally in the presence of an inert diluent or solvent such as benzene or kerosene and/or an acid-binding agent such as triethylamine.

The invention is illustrated but not limited by the following examples:

Example 1

1.25 kg. of methyl triphenylmethyl amine are dissolved in 10 litres of acetone. The addition of this solution to 500,000 litres of water gives a mixture which is lethal to *Australorbis glabratus* and *Bulinus truncatus*.

Example 2

6.25 kg. of ethyl triphenylmethyl amine are dissolved in 100 litres of polyethylene glycol. The addition of 1 litre of this solution to 50,000 litres of water gives a mixture which is lethal to *Australorbis glabratus* and *Bulinus truncatus*.

Example 3

250 g. of n-propyl triphenlymethyl amine are dissolved in 10 litres of kerosene. The addition of this solution to 1 million litres of water gives a mixture which is lethal to *Australorbis glabratus* and *Bulinus truncatus*.

Example 4

250 g. of n-propyl triphenylmethyl amine are dissolved in 10 litres of kerosene and 40 g. of a condensation product of octylcresol with 8–10 molecular proportions of ethylene oxide (as wetting agent), are added. The addition of this solution to 1 million litres of water gives a mixture which is lethal to *Australorbis glabratus* and *Bulinus truncatus*.

Example 5

1.25 kg. of n-propyl triphenylmethyl amine are dissolved in 100 litres of liquid paraffin and 200 g. of a condensation product of octylcresol with 8–10 molecular proportions of ethylene oxide (as wetting agent), are added. The addition of this solution to 5 million litres of water gives a mixture which is lethal to *Australorbis glabratus* and *Bulinus truncatus*.

Example 6

1.25 kg. of isopropyl triphenylmethyl amine are dissolved in 10 litres of acetone. The solution is then added to 500,000 litres of water to give a mixture which is lethal to *Australorbis glabratus* and *Bulinus truncatus*.

Example 7

250 g. of n-butyl triphenylmethyl amine are dissolved in 10 litres of trichlorethylene. The addition of this solution to 1 million litres of water gives a mixture which is lethal to *Australorbis glabratus* and *Bulinus truncatus*.

Example 8

250 g. of phenyl triphenylmethyl amine are dissolved in 10 litres of toluene. This solution is then added to 1 million litres of water to give a mixture which is lethal to *Australorbis glabratus* and *Bulinus truncatus*.

Example 9

1.25 kg. of p-chlorophenyl triphenylmethyl amine are dissolved in 100 litres of toluene and 200 g. of a condensation product of octylcresol with 8–10 molecular proportions of ethylene oxide (as wetting agent), are added. The addition of this solution to 5 million litres of water gives a mixture which is lethal to *Australorbis glabratus* and *Bulinus truncatus*.

Example 10

2.5 kg. of ethyl triphenylmethyl ether are dissolved in 100 litres of acetone. The addition of 1 litre of this solution to 50,000 litres of water gives a mixture which is lethal to *Australorbis glabratus* and *Bulinus truncatus*.

Example 11

25 g. of ethyl triphenylmethyl ether are dissolved in 1 litre of chloroform. The addition of this solution to 50,000 litres of water gives a mixture which is lethal to *Australorbis glabratus* and *Bulinus truncatus*.

Example 12

25 g. of n-butyl triphenylmethyl ether are dissolved in 1 litre of polyethylene glycol. The addition of this solution to 50,000 litres of water gives a mixture which is lethal to *Australorbis glabratus* and *Bulinus truncatus*.

Example 13

99 g. of n-propyl triphenylmethyl amine hydrochloride in a suitable mixer is sprayed with a mixture of 0.5 g. of a polyglyceride ricinoleate (as dispersing agent), 0.5 g. of a condensation product of octylcresol with 8–10 molecular proportions of ethylene oxide (as wetting agent) and 1 g. of water. The whole is mechanically mixed until homogeneous, and then dried at 50° C. The addition of 1 g. of this dispersible powder to 4,000 litres of water gives a mixture that is lethal to *Australorbis glabratus* and *Bulinus truncatus*.

The hydrochloride used as starting material may be obtained by adding 2 cc. of concentrated aqueous hydrochloric acid to a vigorously stirred solution of 6 g. of n-propyl triphenylmethyl amine in 15 cc. of ether. The mixture is filtered and the solid residue is washed with ether and crystallised from a mixture of methanol and ether to give n-propyl triphenylmethyl amine hydrochloride, M.P. 192–193° C.

Example 14

The composition described in Example 13 is prepared except that the base hydrochloride used as active ingredient is replaced by the corresponding base nitrate. There is likewise obtained a dispersible powder, 1 g. of which added to 4,000 litres of water gives a mixture that is lethal to *Australorbis glabratus* and *Bulinus truncatus*.

The base nitrate used as starting material may be obtained as follows:

0.5 g. of n-propyl triphenylmethyl amine is dissolved in 3 cc. of ether and 0.5 cc. of 5 N aqueous nitric acid is added with stirring. The mixture is filtered and the solid residue is washed with ether and crystallised from a mixture of methanol and ether. There is thus obtained n-propyl triphenylmethyl amine nitrate, M.P. 184° C. with decomposition.

Example 15

1.5 g. of n-propyl triphenylmethyl amine are dissolved in 10 cc. of ether and 5 cc. of a 2.2 N aqueous isethionic acid solution are added with stirring. After 15 minutes the solution is evaporated to dryness in vacuo and the resdue is washed with ether and then crystallised from a mixture of methanol and ether. There is thus obtained n-propyl triphenylmethyl amine isethionate, M.P. 142–143° C.

The addition of 375 g. of this salt to 1 million litres of water gives a solution which is lethal to *Australorbis grabatus* and *Bulinus truncatus*.

Example 16

1 cc. of a 1% solution of n-propyl triphenylmethyl amine in acetone is placed on a filter paper and the filter paper is dried. Introduction of this impregnated filter paper into 3 litres of water gives a mixture that is lethal to *Australorbis glabratus* and *Bulinus truncatus*.

Example 17

A solution of 0.05 g. of isobutyl triphenylmethyl amine in 0.5 cc. of kerosene containing 0.002 g. of a condensation product of octylcresol with 8–10 molecular proportions of ethylene oxide (as wetting agent), is added to a piece of cloth and the cloth is dried. Introduction of this impregnated cloth into 25 litres of water gives a mixture that is lethal to *Australorbis glabratus* and *Balinus truncatus*.

Example 18

A solution of 0.0075 g. of n-propyl triphenylmethyl amine in 0.1 cc. of kerosene containing 0.0004 g. of a condensation product of octylcresol with 8–10 molecular proportions of ethylene oxide (as wetting agent), is placed on an unglazed porcelain tile and the tile is dried. Introduction of this impregnated porcelain tile into 3 litres of water gives a mixture that is lethal to *Australorbis glabratus* and *Bulinus truncatus*.

Example 19

A solution of 0.0075 g. of isobutyl triphenylmethyl amine in 5 cc. of acetone is absorbed on a porcelain block and the block is dried. Introduction of this impregnated block into 3 litres of water gives a mixture that is lethal to *Australorbis glabratus* and *Bulinus truncatus*.

Example 20

A solution of 0.0075 g. of n-propyl triphenylmethyl amine in 5 cc. of kerosene containing 0.02 g. of a condensation product of octylcresol with 8–10 molecular proportions of ethylene oxide (as wetting agent), is placed on a piece of coarse brick and the brick is dried. Introduction of this impregnated brick into 3 litres of water gives a mixture that is lethal to *Australorbis glabratus* and *Bulinus truncatus*.

Example 21

250 g. of isobutyl triphenylmethyl amine are dissolved in 10 litres of acetone. The addition of this solution to 1 million litres of water gives a mixture which is lethal to *Australorbis glabratus* and *Bulinus truncatus*.

Example 22

250 g. of isobutyl triphenylmethyl amine are dissolved in 10 litres of kerosene. The addition of this solution to 1 million litres of water gives a mixture which is lethal to *Australorbis glabratus* and *Bulinus truncatus*.

Example 23

250 g. of isobutyl triphenylmethyl amine are dissolved in 750 cc. of toluene and 3 g. of a condensation product of octylcresol with 8–10 molecular proportions of ethylene oxide (as a wetting agent), are added. The addition of this solution to 1 million litres of water gives a mixture which is lethal to *Australorbis glabratus* and *Bulinus truncatus*.

Replacement of the 750 cc. of toluene by 1,700 cc. kerosene as solvent in the above example likewise provides a solution which when added to 1 million litres of water gives a mixture that is lethal to *Australorbis glabratus* and *Bulinus truncatus*.

Example 24

40 cc. of triphenylmethyl chloride are dissolved in 100 cc. of dry benzene and the solution is added to a vigorously stirred, cold solution of 23 cc. of isobutylamine in 100 cc. of dry benzene. The mixture is stirred at 18–22° C. for 30 minutes and is then heated under reflux for 4 hours. The reaction mixture is cooled and filtered and the filtrate is washed with cold water. The benzene solution is dried over magnesium sulphate, and it is then evaporated to dryness. The residual syrup is crystallised from methanol to give isobutyl triphenylmethyl amine, M.P. 69° C.

Example 25

100 g. of isobutyl triphenylmethyl amine hydrochloride are pasted with a solution of 4.5 g. of a condensation product of octylcresol with 8–10 molecular proportions of ethylene oxide and 5 g. of a polyglyceride ricinoleate in a mixture of 10 cc. of ethyl alcohol and 40 cc. of acetone. The solvent is allowed to evaporate after which the solid mixture is milled. There is thus obtained a dispersible powder.

1 g. of this dispersible powder may be added to 4,000 litres of water to give a mixture that is lethal to *Australorbis glabratus* and *Bulinus truncatus*.

The isobutyl triphenylmethyl amine hydrochloride used above may be prepared as follows:

13 g. of isobutyl triphenylmethyl amine are dissolved in 20 cc. of ether and excess of etherial hydrogen chloride is added with vigorous stirring. The mixture is filtered and the solid residue is washed with ether and crystallised from a mixture of methanol and ether to give isobutyl triphenylmethyl amine hydrochloride, M.P. 172–174° C. with decomposition.

Example 26

The composition described in Example 25 is prepared except that the base hydrochloride used as active ingredient is replaced by the corresponding base sulphate. There is likewise obtained a dispersible powder, 1 g. of which added to 4,000 litres of water gives a mixture that is lethal to *Australorbis glabratus* and *Bulinus truncatus*.

The base sulphate used as starting material may be prepared as follows:

0.5 g. of isobutyl triphenylmethyl amine is dissolved in 3 cc. of ether and 0.5 cc. of 5 N aqueous sulphuric acid is added with vigorous stirring. The mixture is filtered and the solid residue is washed with ether and crystallised from a mixture of methanol and ether to give isobutyl triphenylmethyl amine sulphate, M.P. 170–172° C. with decomposition.

Example 27

The composition described in Example 25 is prepared except that the base hydrochloride used as active ingredient is replaced by the corresponding base nitrate.

There is likewise obtained a dispersible powder, 1 g. of which added to 4,000 litres of water gives a mixture that is lethal to *Australorbis glabratus* and *Bulinus truncatus*.

The base nitrate used as starting material may be prepared as follows:

0.5 g. of isobutyl triphenylmethyl amine is dissolved in 3 cc. of ether and 0.5 cc. of 5 N aqueous nitric acid is added. The mixture is stirred vigorously and is then filtered. The solid residue is washed with ether and crystallised from a mixture of methanol and ether to give isobutyl triphenylmethyl amine nitrate, M.P. 169–170° C. with decomposition.

Example 28

100 g. of the dispersible powder containing isobutyl triphenylmethyl amine hydrochloride, prepared as described in Example 25, and 4 kilos of copper sulphate pentahydrate are mixed in a mechanical mixer and the mixture is then ground to a fine powder. The addition of 41 g. of this powdered mixture to 4,000 litres of water gives an aqueous mixture that is lethal to *Australorbis glabratus* and *Bulinus truncatus*.

Example 29

The composition described in Example 25 is prepared except that the isobutyl triphenylmethyl amine hydrochloride used as active ingredient is replaced by a corresponding amount of methyl triphenylmethyl amine hydrochloride. There is thus obtained a dispersible powder, 2.5 g. of which added to 1,000 litres of water gives an aqueous mixture that is lethal to *Australorbis glabratus* and *Bulinus truncatus*.

Example 30

The composition described in Example 25 is prepared except that the isobutyl triphenylmethyl amine hydrochloride used as active ingredient is replaced by a corresponding amount of ethyl triphenylmethyl amine hydrochloride. There is thus obtained a dispersible powder, 1.25 g. of which added to 1,000 litres of water gives an aqueous mixture that is lethal to *Australorbis glabratus* and *Bulinus truncatus*.

Example 31

The composition described in Example 25 is prepared except that the isobutyl triphenylmethyl amine hydrochloride used as active ingredient is replaced by a corresponding amount of isopropyl triphenylmethyl amine hydrochloride.

There is thus obtained a dispersible powder, 2.5 g. of which added to 1,000 litres of water gives an aqueous mixture that is lethal to *Australorbis glabratus* and *Bulinus truncatus*.

Example 32

The composition described in Example 25 is prepared except that the isobutyl triphenylmethyl amine hydrochloride used as active ingredient is replaced by a corresponding amount of sec.-butyl triphenylmethyl amine hydrochloride.

There is thus obtained a dispersible powder, 5 g. of which added to 1,000 litres of water gives a mixture that is lethal to *Australorbis glabratus* and *Bulinus truncatus*.

Example 33

The composition described in Example 25 is prepared except that the isobutyl triphenylmethyl amine hydrochloride used as active ingredient is replaced by a corresponding amount of n-butyl triphenylmethyl amine hydrochloride.

There is thus obtained a dispersible powder, 0.25 g. of which added to 1,000 litres of water gives an aqueous mixture that is lethal to *Australorbis glabratus* and *Bulinus truncatus*.

Example 34

5.4 g. of tri(p-tolyl)methyl chloride are dissolved in 40 cc. of dry toluene and the solution is added to a stirred solution of 2 g. of n-propylamine in 10 cc. of dry toluene. The mixture is stirred at 18–22° C. for 1 hour and is then heated under reflux for 1 hour. The reaction mixture is cooled, extracted with water and the toluene solution is dried over magnesium sulphate. The toluene is removed by evaporation and the residue is distilled to give n-propyl tri(p-tolyl)methyl amine, B.P. 186–189° C./0.05 mm.

1 g. of this n-propyl tri(p-tolyl)methyl amine is dissolved in 10 cc. of acetone. The addition of this solution to 1,000 litres of water gives an aqueous mixture that is lethal to *Australorbis glabratus* and *Bulinus truncatus*.

Example 35

11.7 g. of tri(p-chlorophenyl)methyl chloride are dissolved in 20 cc. of dry benzene and the solution is added to a solution of 3.5 g. of n-propylamine in 10 cc. of dry benzene. The mixture is stirred for 1 hour at 18–22° C. and is then heated under reflux for 1 hour. The reaction mixture is cooled and extracted with water and the benzene solution is dried over magnesium sulphate. The benzene is removed by evaporation and the residue is crystallised from methanol to give n-propyl tri(p-chlorophenyl)methyl amine, M.P. 132° C.

Example 36

9.5 g. of triphenylmethylchloride are dissolved in 25 cc. of dry benzene and the solution is added to a stirred solution of 4.4 g. of isopropylamine in 15 cc. of dry benzene. After stirring at 18–22° C. for 1 hour, the reaction mixture is heated under reflux for 2 hours. It is then cooled and extracted with water and the benzene solution is separated and dried over magnesium sulphate. The benzene is removed by evaporation and the residue is triturated with methanol. The solid so obtained is crystallised from methanol to give isopropyl triphenylmethyl amine, M.P. 81–83° C.

The hydrochloride is prepared by dissolving the base in ether and adding thereto an excess of ethereal hydrogen chloride. The solid so obtained is crystallised from a mixture of methanol and ether to give isopropyl triphenylmethyl amine hydrochloride, M.P. 107° C.

Example 37

16 g. of triphenylmethyl chloride are dissolved in 25 cc. of dry benzene and the solution is added to a stirred solution of 9.2 g. of sec.-butylamine dissolved in 15 parts dry benzene. After stirring at 18–22° C. for 1 hour, the mixture is heated under reflux for 2 hours and then cooled and filtered. The filtrate is evaporated to dryness and the residual syrup is then distilled under reduced pressure. There is thus obtained sec.-butyl triphenylmethyl amine, B.P. 145° C./0.1 mm.

The hydrochloride is prepared by dissolving the base in ether and adding thereto an excess of ethereal hydrogen chloride. The solid so obtained is crystallised from a mixture of methanol and ether to give sec.-butyl triphenylmethyl amine hydrochloride, M.P. 158° C.

1 g. of the above base is dissolved in 10 cc. of toluene and 0.02 g. of a condensation product of octylcresol with 8–10 molecular proportions of ethylene oxide (as wetting agent), is added. The addition of this solution to 1,000 litres of water gives a mixture that is lethal to *Australorbis glabratus* and *Bulinus truncatus*.

Example 38

33.3 g. of triphenylmethyl chloride are dissolved in 60 cc. of dry toluene and the solution is added to a stirred solution of 19.2 g. of n-butylamine in 10 cc. of dry toluene. After stirring at 18–22° C. for 1 hour the mixture is heated under reflux for 2 hours and then cooled. It is extracted with water and the toluene solution is then dried over magnesium sulphate. The toluene is then evaporated and the residual syrup is triturated with methanol. The solid so obtained is crystallised from methanol to give n-butyl triphenylmethyl amine, M.P. 56–57° C.

The hydrochloride is prepared by dissolving the base in ether and adding thereto an excess of ethereal hydrogen chloride. The solid so obtained is crystallised from a mixture of methanol and ether to give n-butyl triphenylmethyl amine hydrochloride, M.P. 175–176° C.

*Example 39*

100 g. of iso-butyl triphenylmethyl amine hydrochloride are pasted with a solution of 5 g. of a condensation product of octylcresol with 8–10 molecular proportions of ethylene oxide (as wetting agent) in 50 cc. of acetone. The solvent is allowed to evaporate and then 20 g. of dried starch are added and intimately mixed. A sufficient quantity of 10% maize starch paste is added to the mixture to produce a mass suitable for granulation. The mass is forced through an 8 mesh screen and dried at 60° C. to constant weight. The dried mass is then forced through a 12 mesh screen after which 1 part of magnesium stearate is added and the mixture is compressed into tablets. These tablets, when placed in water, provide a medium which is lethal to *Australorbis glabratus* and *Bulinus truncatus*.

*Example 40*

100 g. of isobutyl triphenylmethyl amine hydrochloride are pasted with a solution of 5 g. of a condensation product of octylcresol with 8–10 molecular proportions of ethylene oxide (as wetting agent), in 50 cc. of acetone. The solvent is allowed to evaporate and then 100 g. of urea are added and intimately mixed. The mixture is then compressed into tablets. These tablets, when placed in water, slowly release the active ingredient to give a medium lethal to *Australorbis glabratus* and *Bulinus truncatus*.

*Example 41*

100 g. of isobutyl triphenylmethyl amine hydrochloride are pasted with a solution of 5 g. of a condensation product of octylcresol with 8–10 molecular proportions of ethylene oxide (as wetting agent) in 50 cc. of acetone. After the acetone has been allowed to evaporate, the mass is further pasted with a sufficient quantity of a solution of 5 g. of shellac in 100 cc. of ethanol. The ethanol is allowed to evaporate after which 1 part of magnesium stearate is added to the mixture and it is then compressed into tablets. These tablets, when placed in water, very slowly release the active ingredient to give a medium that is lethal to *Australorbis glabratus* and *Bulinus truncatus*.

*Example 42*

250 g. of isobutyl triphenylmethyl amine are dissolved in 10 litres of kerosene and 40 g. of a condensation product of octylcresol with 8–10 molecular proportions of ethylene oxide (as wetting agent) are added. 1 kg. of sodium 2:4-dichlorophenoxy acetate is added to the solution and the mixture is ball-milled. The addition of this mixture to 1 million litres of water gives a mixture that is lethal to *Australorbis glabratus* and *Bulinus truncatus* and also to plants.

The sodium 2:4-dichlorophenoxy acetate used in the above formulation may be replaced by sodium 2-methyl-4-chloro phenoxy acetate and there is likewise obtained a mixture which is lethal to *Australorbis glabratus* and *Bulinus truncatus*.

*Example 43*

250 g. of isobutyl triphenylmethyl amine are dissolved in 10 litres of toluene and 40 g. of a condensation product of octylcresol with 8–10 molecular proportions of ethylene oxide (as wetting agent) are added. To this solution are added 100 g. of gamma-benzene hexachloride and 2 kg. of dichlorodiphenyltrichlorethane. The addition of this mixture to 4 million litres of water gives a mixture that is lethal to *Australorbis glabratus* and *Bulinus truncatus* and also to insects.

*Example 44*

100 g. of the dispersible powder of isobutyl triphenylmethyl amine hydrochloride, prepared as described in Example 25 are intimately mixed with a mixture of 45 g. of dichlorodiphenyltrichloroethane, 12.5 g. of benzene hexachloride, of which ⅕ is the gamma isomer, 35 g. of kaolin and 7.5 g. of a condensation product of octylcresol with 8–10 molecular proportions of ethylene oxide in a mechanical mixer. The addition of this mixture to 100,000 litres of water gives a mixture that is lethal to *Australorbis glabratus* and *Bulinus truncatus* and also to insects.

*Example 45*

0.22 part of 2:4-dichlorophenoxyacetic acid and 0.3 part of n-propyl triphenylmethyl amine are dissolved in 25 parts of dry ether. The solution is then evaporated and the residual syrup is triturated with petroleum ether, B.P. 40–60° C. The mixture is filtered and the solid residue is well washed with petroleum ether. There is thus obtained n-propyl triphenylmethyl amine 2:4-dichlorophenoxyacetate, M.P. 111–112° C.

What we claim is:

1. A molluscicidal composition comprising, as the essential active ingredient, a triphenylmethane derivative selected from the group consisting of compounds which have the formula $R_3CR'$ and compounds which in the free base form have the formula $R_3CR''$ wherein R is selected from the group consisting of phenyl, halophenyl and alkylphenyl radicals, R' is a lower alkoxy radical and R'' is selected from the group consisting of lower alkylamino, phenylamino and halogenophenylamino.

2. A composition according to claim 1 including a liquid carrier for said active ingredient.

3. A composition according to claim 2 including a member of the group consisting of dispersing and wetting agents.

4. A composition according to claim 2 wherein said carrier is a water-miscible liquid.

5. A composition according to claim 4 wherein said liquid is acetone.

6. A composition according to claim 1 in solid form and including an inert solid carrier therefor.

7. A composition according to claim 1 in solid form and coated to delay release of the active ingredient.

8. A composition according to claim 2 wherein said carrier is a water-immiscible liquid.

9. A composition according to claim 8 wherein said liquid is selected from the group consisting of kerosene and toluene.

10. A composition according to claim 2 comprising an aqueous emulsion of the active ingredient including a water-immiscible liquid and an emulsifying agent.

11. A composition according to claim 3 including a condensation product of octylcresol with 8–10 molecular proportions of ethylene oxide as a wetting agent.

12. A composition according to claim 1 comprising a solution of the active ingredient in a water-immiscible liquid selected from the group consisting of kerosene and toluene in the presence of a condensation product of octylcresol with 8–10 molecular proportions of ethylene oxide.

13. A composition according to claim 12 comprising between 0.5 to 50% by weight of the active ingredient.

14. A composition according to claim 12 comprising between 5 and 40% by weight of the active ingredient.

15. A composition according to claim 1 in the form of a dispersible powder, the active ingredient being present as the hydrochloride salt.

16. A composition according to claim 1 wherein the active ingredient is impregnated on an absorbent, solid material.

17. A composition according to claim 1 wherein the active ingredient is selected from the group consisting of ethyl triphenylmethyl ether, n-butyl triphenylmethyl ether, methyl triphenylmethyl amine and its hydrochloride, ethyl triphenylmethyl amine, and its hydrochloride, n-propyl triphenylmethyl amine, and its hydrochloride, nitrate and isethionate, iso-propyl triphenylmethyl amine and its hydrochloride, n-butyl triphenylmethyl amine and its hydrochloride, isobutyl triphenylmethyl amine and its hydrochloride, sulphate and nitrate, sec.-butyl triphenylmethyl amine and its hydrochloride, phenyl triphenylmethyl amine, p-chlorophenyl triphenylmethyl amine, n-propyl tri-(p-tolyl)methyl amine and n-propyl tri-(p-chlorophenyl)methyl amine.

18. A composition according to claim 1 including copper sulphate.

19. A composition as claimed in claim 2 including a member of the group consisting of 2-methyl-4-chloro- and 2:4-dichloro-phenoxy acetic acid and salts thereof, γ-2-methyl-4-chloro- and γ-2:4-dichloro-phenoxybutyric acid and salts thereof, dichlorodiphenyltrichloroethane and γ-benzene hexachloride.

20. A method of combatting mollusca which comprises contacting same with a triphenylmethane derivative selected from the group consisting of compounds which have the formula $R_3CR'$ and compounds which in the free base form have the formula $R_3CR''$ wherein R is selected from the group consisting of phenyl, halophenyl and alkylphenyl radicals, R' is a lower alkoxy radical and R'' is selected from the group consisting of lower alkylamino, phenylamino and halogenophenylamino.

21. Compositions as claimed in claim 1 wherein the active ingredient is a salt selected from the group consisting of the hydrochlorides, nitrates, sulphates and isthionates.

22. Compositions as claimed in claim 1 wherein the active ingredient is a salt of an acid selected from the group consisting of 2-methyl-4-chloro- and 2:4-dichlorophenoxyacetic acids and γ-2-methyl-4-chloro- and γ-2:4-dichloro-phenoxybutyric acids.

References Cited in the file of this patent

UNITED STATES PATENTS

| Number | Name | Date |
|---|---|---|
| 1,971,436 | Weiler | Aug. 28, 1934 |
| 2,053,610 | Hermann | Sept. 8, 1936 |
| 2,131,712 | Schoeller | Sept. 27, 1938 |
| 2,199,776 | Becherer | May 7, 1940 |
| 2,499,992 | Dieter | Mar. 7, 1950 |
| 2,673,862 | Krimmel | Mar. 30, 1954 |
| 2,678,321 | Krimmel | May 11, 1954 |
| 2,757,118 | Dye | July 31, 1956 |
| 2,789,936 | Davies | Apr. 23, 1957 |